N. Du BRUL.
RELIEF-VALVE.
No. 190,712.
2 Sheets—Sheet 2.
Patented May 15, 1877.
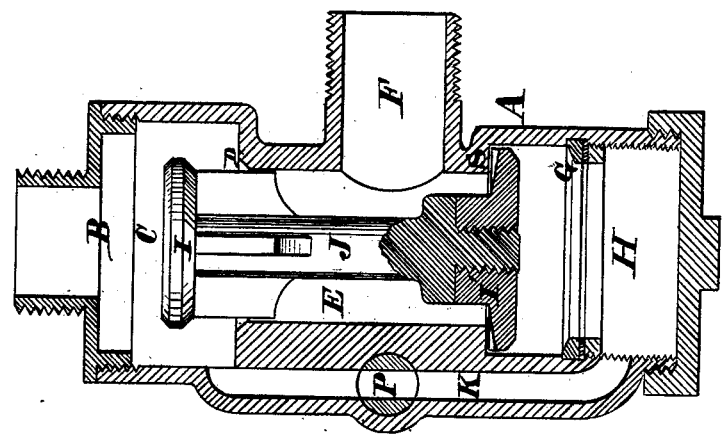
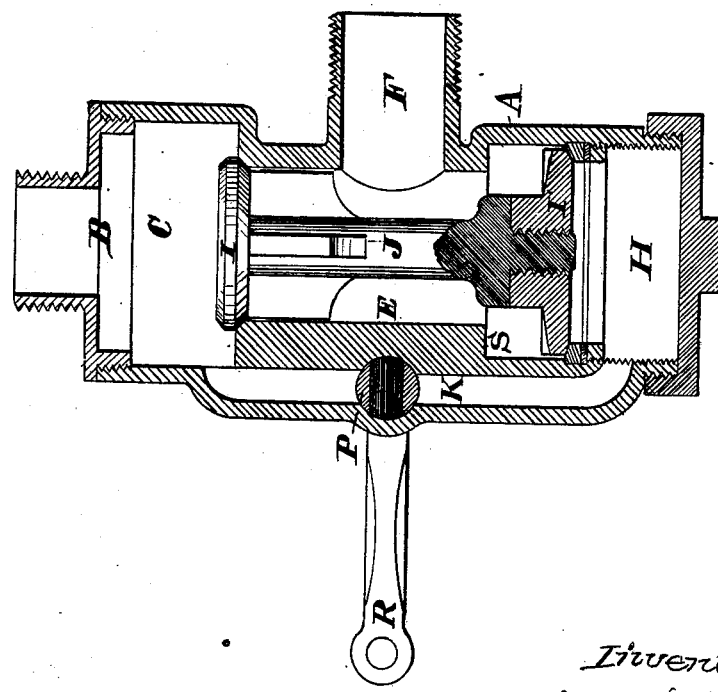
Attest
Walter Knight
Chas. H. Gessert.
Inventor,
Napoleon DuBrul
by Knight Bros. Attys.

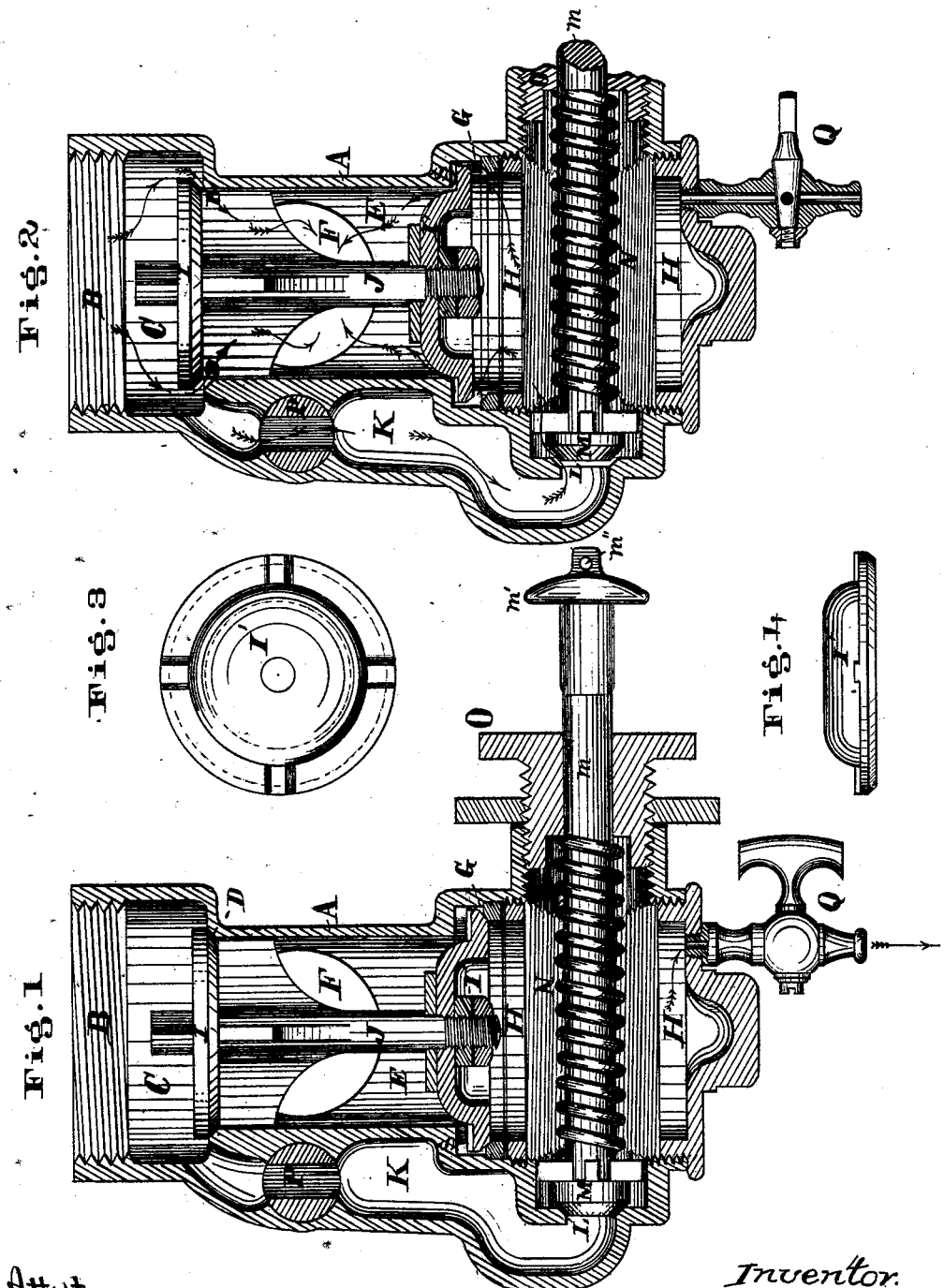

UNITED STATES PATENT OFFICE.

NAPOLEON DU BRUL, OF CINCINNATI, OHIO.

IMPROVEMENT IN RELIEF-VALVES.

Specification forming part of Letters Patent No. 190,712, dated May 15, 1877; application filed February 16, 1877.

*To all whom it may concern:*

Be it known that I, NAPOLEON DU BRUL, of Cincinnati, Hamilton county, Ohio, have invented a new and useful Relief-Valve for the Discharge-Pipes of Fire-Engines, &c., of which the following is a specification:

My invention is designed for attachment to the discharge-pipes of fire-engines and other water-conduits subjected to great and variable pressures, and comprises the following elements: first, a double puppet-valve composed of two rigidly-united conical disks, of unequal area, the smaller one of which is in permanent contact with and opens against the water-pressure in the discharge-pipe; second, a side passage affording interrupted communication from the space above the smaller disk to that below the larger disk, through an aperture guarded by an auxiliary valve of smaller area than said smaller disk; third, a port which conducts from the space between the larger and smaller disks to the street-main or service-pipe.

The above-mentioned auxiliary valve is held shut against the pressure within said passage by means of a suitable spring, adjustable to any prescribed maximum pressure. This auxiliary valve, whenever the pressure in the discharge-pipe exceeds the allotted maximum, opens, and, by thus admitting the entrance of water subject to excessive pressure underneath the larger disk, enables the latter to overcome the pressure on the smaller disk, and to permit surplus water to escape back into the main at both ends of the differential valve simultaneously.

In the accompanying drawings, Figure 1 is an axial section of a relief-valve embodying my improvements, the operative parts being shown closed. Fig. 2 is a similar section, showing the same parts in the open condition. Figs. 3 and 4 are, respectively, a top and an edge view of the larger disk of my double or differential puppet-valve. Figs. 5 and 6 are axial sections of a modification of my invention in the closed and open conditions, respectively.

A may represent any suitable body or inclosing-shell of my relief-valve.

B is a screw-neck for attachment to the discharge-pipe of a fire-engine, and communicating with a chamber, C, having a conical opening, D, that communicates with a chamber, E, having a side port, F, which conducts into the same service-pipe or main from which the engine is drawing its supply of water. This chamber E, which I call the "return-chamber," opens at bottom through another and larger conical opening, G, into a chamber, (which I style my "auxiliary-valve chamber,") H.

In the normal or inactive condition of the apparatus both openings D and G are closed by the two unequal disks I and I' of my double puppet-valve I J I'.

K is a side passage, which I call the "auxiliary passage," whose upper end communicates with the chamber C, and whose lower end communicates with the auxiliary-valve chamber through a conical opening, L.

This opening, in the usual condition of the apparatus, is closed by my auxiliary valve M, which valve is held shut against the pressure by means of a helical spring, N, which is supported, and has its stress regulated, by a screw plug or gland, O, through which the auxiliary-valve stem $m$ passes, and terminates in a knob, $m'$, and eye $m''$. To avoid back pressure on valve M when open, the stem $m$ should exceed in transverse section the area of opening L.

The side passage K may be provided with a stop-cock, P, to enable its optional closure.

The auxiliary-valve chamber H is provided with a drip-cock, Q.

A shoulder, S, in chamber E serves as a stop or check to limit the opening of the port D to a point that insures its closure by the pressure in the chamber C the instant that the counter-pressure below the lower disk is enfeebled by the closure of the auxiliary valve M.

The operation is as follows: The spring N having been adjusted to the desired maximum pressure, and the ports B and F coupled to the discharge-pipe and return-pipe, respectively, the cock P being open and the cock Q closed, and the pump being put in action, then, the moment that the discharge-water exceeds the prescribed maximum, its pressure opens the auxiliary valve M, and, by so doing, brings the chamber C in communication with the chamber H below the double puppet-valve I I' J, lifting the latter, and opening it at both ends for the escape into the return-conduit E F of the surplus water, as shown in Fig. 2.

The instant that the pressure in chamber C falls below the maximum, the auxiliary valve M closing, and thereby withdrawing the excessive pressure from the larger end of the double puppet-valve I I' J, the water-pressure instantly shuts the latter at both ends, so as to wholly arrest the flow in both directions.

This device, having no packed pistons or other sources of friction, and exposing simultaneously two large relief-openings, by the action of a very small auxiliary valve, acts with the promptness and delicacy which are such vital desiderata in a relief-valve.

By this means a relatively small auxiliary valve capable of being controlled by a comparatively light spring can be made effective to cause the opening and closing of a relief-valve of the above-described double description, of such capacity as to secure relief as speedy and copious as may be desired.

It is also apparent that, while in action, the opposing streams, which enter the double valve at both ends in nearly equal currents, co-operate to prevent violent impact of disk I against stop S, and also that, after the closure of the auxiliary valve M, the water imprisoned in the chamber H discharges the function of a cushion to ease the double puppet-valve down to its seats, and thus prevent concussion and "water-ram."

Should it be desired to attain or to preserve a pressure above the prescribed maximum, it may be done by simply closing the cock P. Such closure, of course, entirely isolates the auxiliary-valve movement M, whose agency, as has been seen, is necessary to enable the valve proper to operate.

The same result may be attained by screwing in the gland O, as before stated.

The knob $m'$ enables the opening of the auxiliary valve M by hand, so as to instantly check the discharge of water when no longer useful.

By applying a graduated spring to the eye $m''$ the pressure on the auxiliary valve M may at any time be ascertained, or even regulated from without, if so desired.

My valve is designed more especially for the discharge-pipes of "steam-pumps" and "fire-engines," so called, but is also applicable to hydraulic presses and elevators, and other fluid-conduits subject to great and variable pressures.

Figs. 5 and 6 represent the closed and opened conditions, respectively, of a modification of my valve, in which the side-passage cock P is provided with an arm, R, which may be connected with a pressure-indicator, which, opening and closing the cock automatically, may dispense with the auxiliary valve M; or such arm may be connected with a governor, or other machinery employed for the automatic opening and closing of valves.

I claim as new and of my invention—

1. The combination of the double puppet-valve I I' J and the small auxiliary pressure-valve M, governing the passage K, connecting the chambers C and H above and below the said valve I I' J, respectively, said chambers having simultaneous communication with the return-passage E F between the heads I and I' of said puppet-valve, substantially as and for the purpose designated.

2. The combination of the following elements, to wit: first, a double puppet-valve, of two unequal disks, I I', united by a rigid stem, and of which the smaller disk is in permanent contact with the confined fluid; second, a side passage, K, closed by a spring-valve, M, of relatively small area, and which opens, with any excessive pressure, into a compartment beneath the larger disk, substantially as set forth.

3. The return-chamber E, separated from the discharge-chamber C by port D, guarded by the smaller member I of a double puppet-valve, I I' J, whose larger member I' opens and guards port G of chamber H beneath said puppet-valve, said chamber C having communication with said chamber H by side passage K, whose port L is guarded by valve M, of smaller area than member I, and which is held closed by a spring, N, capable of graduation by gland O to any desired maximum pressure, as and for the purpose set forth.

4. In combination with the double puppet-valve I I' J and conduits C, E, H, and K, the cock P, or its equivalent, for operation in the manner indicated.

5. In combination with the double puppet-valve I I' J and auxiliary passage K, with their described accessories, the stop S, arranged and operating as set forth.

In testimony of which invention I hereunto set my hand.

NAPOLEON DU BRUL.

Attest:
GEO. H. KNIGHT,
WALTER KNIGHT.